(Model.)
2 Sheets—Sheet 1.
J. R. JONES.
CAR SEAT BACK.
No. 245,177.
Patented Aug. 2, 1881.
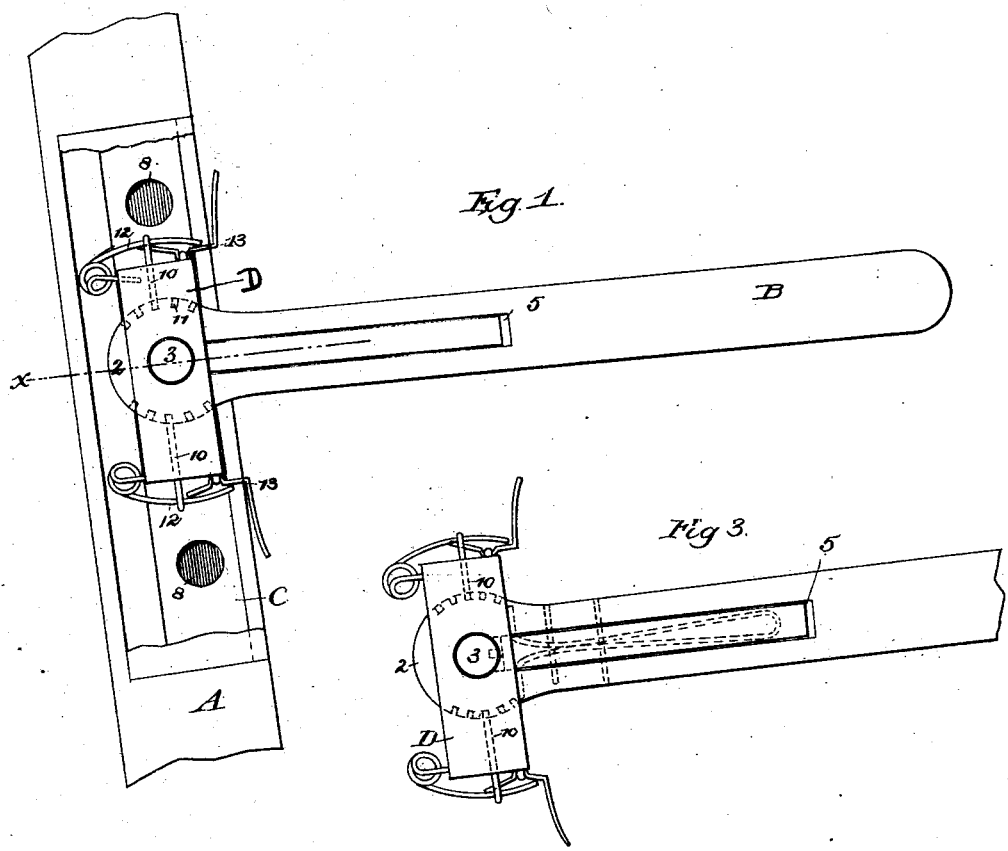
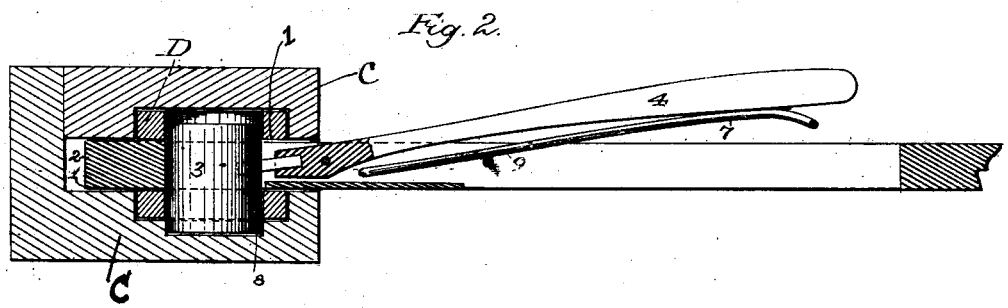
Witnesses:
D. West Wagner,
E. F. Spear.
Inventor
John R. Jones
by Ellis Spear
Atty.
N. PETERS, Photo-Lithographer, Washington, D. C.

(Model.)
2 Sheets—Sheet 2.

J. R. JONES.
CAR SEAT BACK.

No. 245,177.  Patented Aug. 2, 1881.

Witnesses:
J. West Wagner,
F. L. Middleton

Inventor:
John R. Jones
By Ellis Spear
Atty

UNITED STATES PATENT OFFICE.

JOHN R. JONES, OF CLARKSVILLE, IOWA.

CAR-SEAT BACK.

SPECIFICATION forming part of Letters Patent No. 245,177, dated August 2, 1881.

Application filed April 6, 1881. (Model.)

*To all whom it may concern:*

Be it known that I, JOHN R. JONES, of Clarksville, in the county of Butler and State of Iowa, have invented a new and useful Improvement in Car-Seat Backs; and I do hereby declare that the following is a full, clear, and exact description of the same.

My invention relates to seats for railway-cars, and has for its object to secure adjustment of the back of the seat both in respect to the height of the seat-back and the angle of its inclination.

It consists, principally, in hinging the back to the connecting-bars upon which the seat turns by means of a sliding block and locking devices, whereby the back may be raised or lowered upon said connecting-bars or turned at any required angle.

Figure 4:
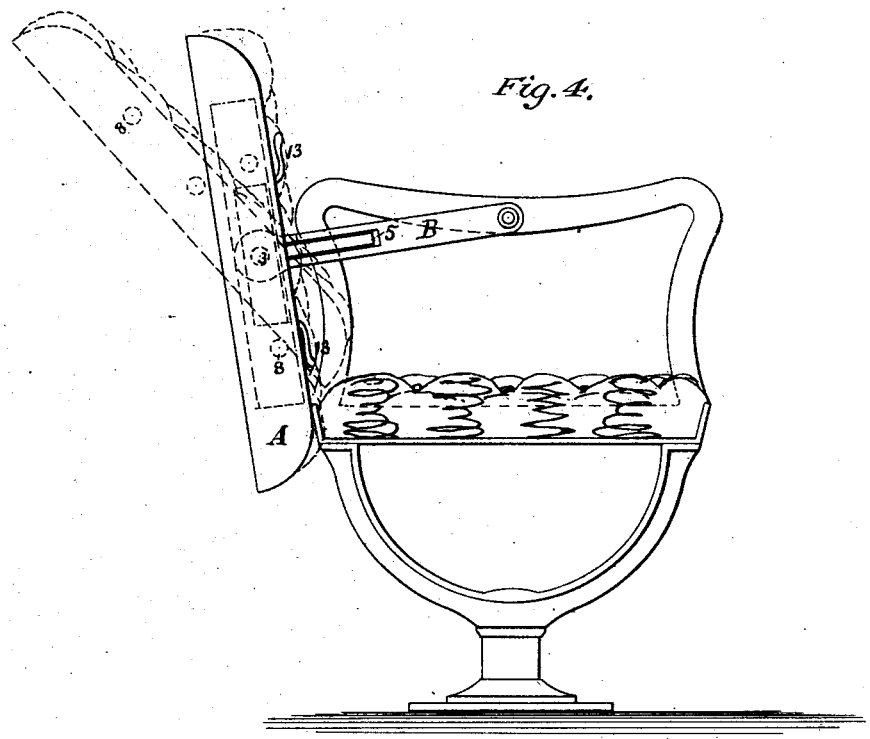
Figure 5:
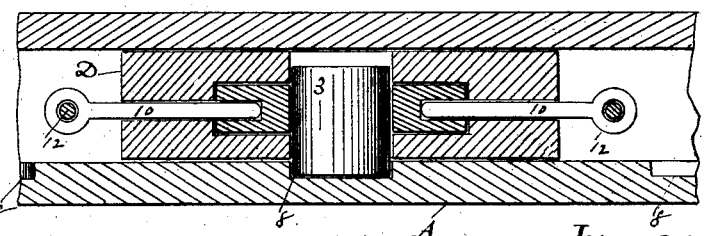

In the accompanying drawings, Figure 1 represents a side elevation of the connecting-bar and a part of the back of the seat. Fig. 2 represents a section on line $x\,x$ of Fig. 1. Fig. 3 represents the sliding block and connecting-bar detached. Fig. 4 is a side elevation, showing the connection between the back and the fixed portion of the seat-arm. Fig. 5 represents a section on the line $y\,y$ of Fig. 1.

In these drawings, A represents the back of the seat. B represents one of the connecting-bars upon which it is hinged, and thus connected to the ordinary seat-frame.

C represents a box or casing, preferably of metal, which is adapted to be connected to the end of the seat-back, and is fitted also to receive the block D, to which the bar B is hinged. The casing C is grooved to receive the block D, as shown in Fig. 2.

The block D is formed with a slot or recess, 1, fitted to receive the rounded head 2 of the bar B, which is pivoted in said block by a short bolt, 3, passing centrally through both block and bar-head. The length of this bolt equals the thickness of the block, and it is held in place by means of a spring-lever, 4, which is pivoted in a slot, 5, in the bar B, the end of the lever being connected to the bolt by means of a small pin, 6. The slot 5 does not extend quite to the bolt-hole, that part of the bar next the bolt-hole being simply channeled to receive the lever. A spring, 7, is connected to the end of the lever opposite that which is connected to the bolt, and tends to keep the lever thrown out from the bar, and thereby the bolt is caused to protrude from the hole in the block a short distance, but not enough to disengage it from its bearings in both sides of the connecting-bars. Holes or notches 8 (three or more in number) are formed in the side of the casing C, underneath the path of the block D, these holes or notches being fitted to receive the bolt 3. It will be understood that said bolt is pressed constantly by the spring 7 toward the side in which these holes or notches are formed.

The case C is closed on both sides, so that the block D is permitted only longitudinal motion in its path, and when in sliding the block comes opposite one of the holes or notches 8 it is thrown into connection therewith by means of the spring-lever, the lever also serving to remove the bolt from the notch whenever it is desired to raise or lower the back.

It will be understood that the casing C is to be bolted or secured to the end of the back midway between the top and bottom thereof, and the seat may be raised or lowered at any time by pressing in the lever 4.

The motion of the lever is limited in one direction by the bottom of the holes or notches, and in the other by contact of the bolt with the smooth side of the case; but a pin, 9, inserted in the slot to hold the spring against the lever, serves also to limit the motion of the lever.

The pivoting heretofore described permits the back to turn freely upon the connecting-bar.

In order to hold the back in any required position, I have provided locking-pins 10 10. These are set in the ends of the block D, and register with a series of holes, 11, in the edge of the rounded end or head of the connecting-bar. These pins are pressed inward by springs 12, fixed to the block, and extending through eyes of the pins and over small bell-crank levers 13, the ends of which project through the slot in which the connecting-bar travels, so as to be within reach of the thumb and finger. The inner ends of these levers are notched, and when the outer ends are moved toward the connecting-bar the inner ends are thrown outward, lifting the ends of the springs which ride in the notches, and thereby withdrawing the locking-pins from the rounded end or head of the connecting-bar.

The bell-crank levers are pivoted on the ends of the block. These devices serve to lock the back at any required angle to the connecting-bar.

The holes in the head must manifestly be in pairs, those of each pair being opposite each other, if two locking-pins are used; but two are used only for greater security, and one pin may be sufficient for the purpose.

The casing C may be a part of the frame of the back, and may be formed out of any suitable material. It is better that all the parts should be of metal, and the pin and working parts may be of steel, if desired.

It will be understood that the described devices are applied to both ends of the seat, and when thus provided the back of the seat may be adjusted to a higher or lower position, or may be tipped to any angle within certain limits, according to the wish of the occupant, and the action is the same whether the back be on one side of the seat or reversed to the other.

Having thus described my invention, what I claim is—

1. In combination with the back A of a car-seat, a sliding block, D, a connecting-bar, B, hinged to said block and connecting it to the seat-frame, a casing, C, having holes or recesses 8, and a spring-actuated pivot-bolt, 3, substantially as described.

2. The combination, with the back of a car-seat, of a casing, C, the recessed block D, having a longitudinal sliding movement in said casing, and the connecting-bar B, hinged to said sliding block by the pivot-bolt 3, and connected to the seat-frame.

3. The combination, in a car-seat, of a casing, C, attached to the back, and having a recess, 8, a sliding block having a locking-bolt, 3, for engaging with said recess 8, a connecting-arm, B, pivoted in said sliding block by said bolt 3, and having a circular head, 2, provided with notches 11, and a series of spring-pins, 10, to engage with the said notches and prevent the head from moving on its pivot, all constructed and arranged so that both the height and inclination of the back may be changed.

In testimony whereof I have signed my names to this specification in the presence of two subscribing witnesses.

JOHN R. JONES.

Witnesses:
J. O. STEWART,
JOHN PALMER.